United States Patent
Xie

(10) Patent No.: US 9,345,102 B2
(45) Date of Patent: May 17, 2016

(54) POWER SUPPLY DEVICE AND ELECTRONIC DEVICE

(71) Applicant: BOE TECHNOLOGY GROUP CO., LTD., Beijing (CN)

(72) Inventor: Hongjun Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/416,041

(22) PCT Filed: Jul. 29, 2014

(86) PCT No.: PCT/CN2014/083221
§ 371 (c)(1),
(2) Date: Jan. 20, 2015

(87) PCT Pub. No.: WO2015/070641
PCT Pub. Date: May 21, 2015

(65) Prior Publication Data
US 2016/0029456 A1    Jan. 28, 2016

(30) Foreign Application Priority Data

Nov. 12, 2013    (CN) .......................... 2013 1 0559854

(51) Int. Cl.
*H05B 33/08*    (2006.01)
*G09G 3/36*    (2006.01)
*H02J 7/04*    (2006.01)
*G09G 3/32*    (2006.01)

(52) U.S. Cl.
CPC .............. *H05B 33/0896* (2013.01); *G09G 3/36* (2013.01); *H02J 7/04* (2013.01); *G09G 3/3225* (2013.01); *G09G 2330/02* (2013.01)

(58) Field of Classification Search
CPC ....... H05B 33/0896; G09G 3/36; G09G 3/32; H03J 7/04
USPC ......................................................... 315/161
See application file for complete search history.

(56) References Cited

U.S. PATENT DOCUMENTS 5,998,979 A * 12/1999 Nilsson ................... G05F 1/565
                                                                      323/273
2005/0200622 A1* 9/2005 Yajima ................. G09G 3/3696
                                                                      345/211

(Continued)

FOREIGN PATENT DOCUMENTS

CN          1522382 A        8/2004
CN          1667688 A        9/2005

(Continued)

OTHER PUBLICATIONS

Written Opinion of the International Searching Authority for international application No. PCT/CN2014/083221.

(Continued)

*Primary Examiner* — Dylan White
(74) *Attorney, Agent, or Firm* — Harness, Dickey & Pierce, P.L.C.

(57) ABSTRACT

The power supply device includes an AC-DC conversion unit configured to provide a source DC voltage signal; a first DC-DC conversion unit configured to generate a first DC voltage signal and a second DC voltage signal according to the source DC voltage signal, output the first DC voltage signal to the load through a first output interface and output the second DC voltage signal to the load through a second output interface; a reference voltage signal generation unit configured to generate a reference voltage signal by taking the first DC voltage signal and the second DC voltage signal as input signals, output the reference voltage signal to the load; wherein a voltage value of the reference voltage signal is smaller than a voltage value of the first DC voltage signal and is greater than a voltage value of the second DC voltage signal.

17 Claims, 4 Drawing Sheets

(56) References Cited

U.S. PATENT DOCUMENTS

| | | | |
|---|---|---|---|
| 2010/0188874 A1* | 7/2010 | Sato | H02M 1/4225 363/21.18 |
| 2012/0153866 A1* | 6/2012 | Liu | H02M 3/33561 315/294 |
| 2013/0164016 A1* | 6/2013 | Inukai | G03G 15/80 399/88 |

FOREIGN PATENT DOCUMENTS

| | | |
|---|---|---|
| CN | 101826803 A | 9/2010 |
| CN | 202150247 U | 2/2012 |
| CN | 102411898 A | 4/2012 |
| CN | 103383836 A | 11/2013 |
| CN | 103560575 A | 2/2014 |
| JP | H-11289761 A | 10/1999 |
| JP | 2009199861 A | 9/2009 |

OTHER PUBLICATIONS

Chinese Office Action dated Jan. 23, 2015 regarding Application No. 201310559854.9, filed Nov. 12, 2013. Translation provided by Dragon Intellectual Property Law Firm.

* cited by examiner

POWER SUPPLY DEVICE AND ELECTRONIC DEVICE

CROSS-REFERENCE TO RELATED APPLICATION

This application is the U.S. national phase of PCT Application No. PCT/CN2014/083221 filed on Jul. 29, 2014, which claims a priority of the Chinese patent application No. 201310559854.9 filed on Nov. 12, 2013, which is incorporated herein by reference in its entirety.

TECHNICAL FIELD

The present disclosure relates to power supply technology, and more particularly relates to a power supply device which supplies power for an organic electroluminescent diode display panel, and an electronic device including the power supply device.

BACKGROUND

Comparing with existing thin film transistor liquid crystal display devices, active matrix organic light emitting diode (AMOLED) display devices provide more brilliant colors and have wider color gamut.

In order to drive an AMOLED panel, three electric signals (one electric signal for supplying power for an electroluminescent (EL) film, one electric signal for supplying power for calculation or logical operation devices, and one electric signal for supplying power for a system) are required. As shown in FIG. 1, the three electric signals are VCC signal, ELVDD signal and ELVSS signal, respectively.

In the related art, the above three signals are generated by different power structures, respectively. Respective direct current-direct current (DC-DC) conversion units are required for generating the above signals. Efficiency of the existing DC-DC conversion unit is usually about 85%, and loss in conversion process are dissipated by the form of heat. This electrical energy consumption is also included in a total power consumption of the whole electric device. Thus, the more the DC-DC conversion units in the whole power supply structure are, the higher the power consumption of the whole device is.

Although the AMOLED panel is taken as an example for illustrating the problem of high power consumption/low power efficiency in the related art. It should be understand that other power structures which separately generate positive voltages and negative voltages have the above problem, which will not be listed here one by one.

SUMMARY

One object of one embodiment of the present disclosure provides a power supply device and an electronic device, which can improve efficiency of power supply and reduce total power consumption of the device.

In order to achieve the above object, one embodiment of the present disclosure provides a power supply device for outputting a first direct current voltage signal of a first voltage and a second direct current voltage signal of a second voltage to a load, the power supply device including:

an alternating current-direct current conversion unit configured to provide a source direct current voltage signal;

a first direct current-direct current conversion unit configured to generate the first direct current voltage signal and the second direct current voltage signal according to the source direct current voltage signal, output the first direct current voltage signal to the load through a first output interface and output the second direct current voltage signal to the load through a second output interface;

a reference voltage signal generation unit configured to generate a reference voltage signal by taking the first direct current voltage signal and the second direct current voltage signal as input signals, output the reference voltage signal to the load;

wherein a voltage value of the reference voltage signal is smaller than a voltage value of the first direct current voltage signal and is greater than a voltage value of the second direct current voltage signal.

In one example, the power supply device further includes a second direct current-direct current conversion unit; wherein the reference voltage signal generation unit is further configured to output the reference voltage signal to the second direct current-direct current conversion unit; the second direct current-direct current conversion unit is configured to generate a third direct current voltage signal according to the source direct current voltage signal and the reference voltage signal, and output the third direct current voltage signal to the load so as to be used by a logic circuit of the load.

In one example, the reference voltage generation unit includes:

a voltage divider connected between the first output interface and the second output interface; wherein the voltage divider has a voltage dividing node, and a voltage value of the voltage dividing node is between the voltage value of the first direct current voltage signal and the voltage value of the second direct current voltage signal;

a voltage follower connected with the voltage dividing node, and configured to generate the reference voltage signal, a voltage value of the reference voltage signal following the voltage value of the voltage dividing node.

In one example, the voltage follower is an operational amplifier; a positive input terminal of the operational amplifier is electrically connected with the voltage dividing node; an inverting input terminal of the operational amplifier is electrically connected with an output terminal of the operational amplifier; a positive power supply terminal of the operational amplifier is electrically connected with the first output interface; an inverting power supply terminal of the operational amplifier is electrically connected with the second output interface.

In one example, the voltage divider includes a first resistor and a second resistor connected in series; the voltage dividing node is arranged between the first resistor and the second resistor.

In one example, at least one of the first resistor and the second resistor is an adjustable resistor.

In one example, the power supply device further includes:

a control unit configured to control resistance of the adjustable resistor, so as to control the voltage value of the reference voltage signal output from the voltage follower.

In order to better achieve the above object, one embodiment of the present disclosure further provides an electronic device including a load and the above power supply device.

In one example, the load is an active matrix organic light emitting diode display panel.

In one example, the first direct current voltage signal generated by the power supply device is an ELVDD signal which drives electroluminescence of the active matrix organic light emitting diode display panel; the second direct current voltage signal generated by the power supply device is an ELVSS signal which drives electroluminescence of the active matrix organic light emitting diode display panel; the reference voltage signal generated by the power supply device is a GND signal.

In one example, the third direct current voltage signal generated by the power supply device is a VCC signal which drives a logic circuit of the active matrix organic light emitting diode display panel.

One embodiment of the present disclosure has following beneficial effects:

In one embodiment of the present disclosure, for a load requiring for a positive voltage and a negative voltage, two power supply signals of different voltage values are firstly generated, then a reference voltage signal of a voltage value between the voltage values of the two power supply signals is generated by using the two power supply signals, and the reference voltage signal is provided to the load so that the load can determine a positive voltage signal and a negative voltage signal based on the reference voltage signal. Comparing with using two DC-DC conversion units to separately generate a positive voltage and a negative voltage in the related art, one embodiment of the present disclosure reduces the number of DC-DC conversion units, thus, the efficiency of power supply can be improved and the total power consumption of the device can be reduced.

DETAILED DESCRIPTION

In one embodiment of the present disclosure, for a load requiring for a positive voltage and a negative voltage, two power supply signals of different voltage values are firstly generated, then a reference voltage signal of a voltage value between the voltage values of the two power supply signals is generated by using the two power supply signals, and the reference voltage signal is provided to the load so that the load can determine a positive voltage signal and a negative voltage signal based on the reference voltage signal. Comparing with using two DC-DC conversion units to separately generate a positive voltage and a negative voltage in the related art, one embodiment of the present disclosure reduces the number of DC-DC conversion units, thus, the efficiency of power supply can be improved and the total power consumption of the device can be reduced.

Before a detailed description of embodiments of the present disclosure, some concepts of the embodiments of the present disclosure are firstly described below, so as to facilitate a better understanding of embodiments of the present disclosure.

Generally, a voltage value of one point in a circuit is determined with respect to a reference voltage; meanwhile, the so-called positive voltage and the negative voltage are also determined with respect to a reference voltage.

A voltage value of one positive voltage signal is greater than a voltage value of the reference voltage signal, while a voltage value of one negative voltage signal is smaller than the voltage value of the reference voltage signal.

In many cases, the above voltage values are obtained by taking the earth as a reference voltage.

In one specific embodiment of the present disclosure, two voltage signals of different voltage values generated by DC-DC are used to generate a reference voltage signal of a voltage value between the voltage values of the two voltage signals, and the reference voltage signal is output to a load, and the load can work according to obtained three voltage signals.

Figure 1:
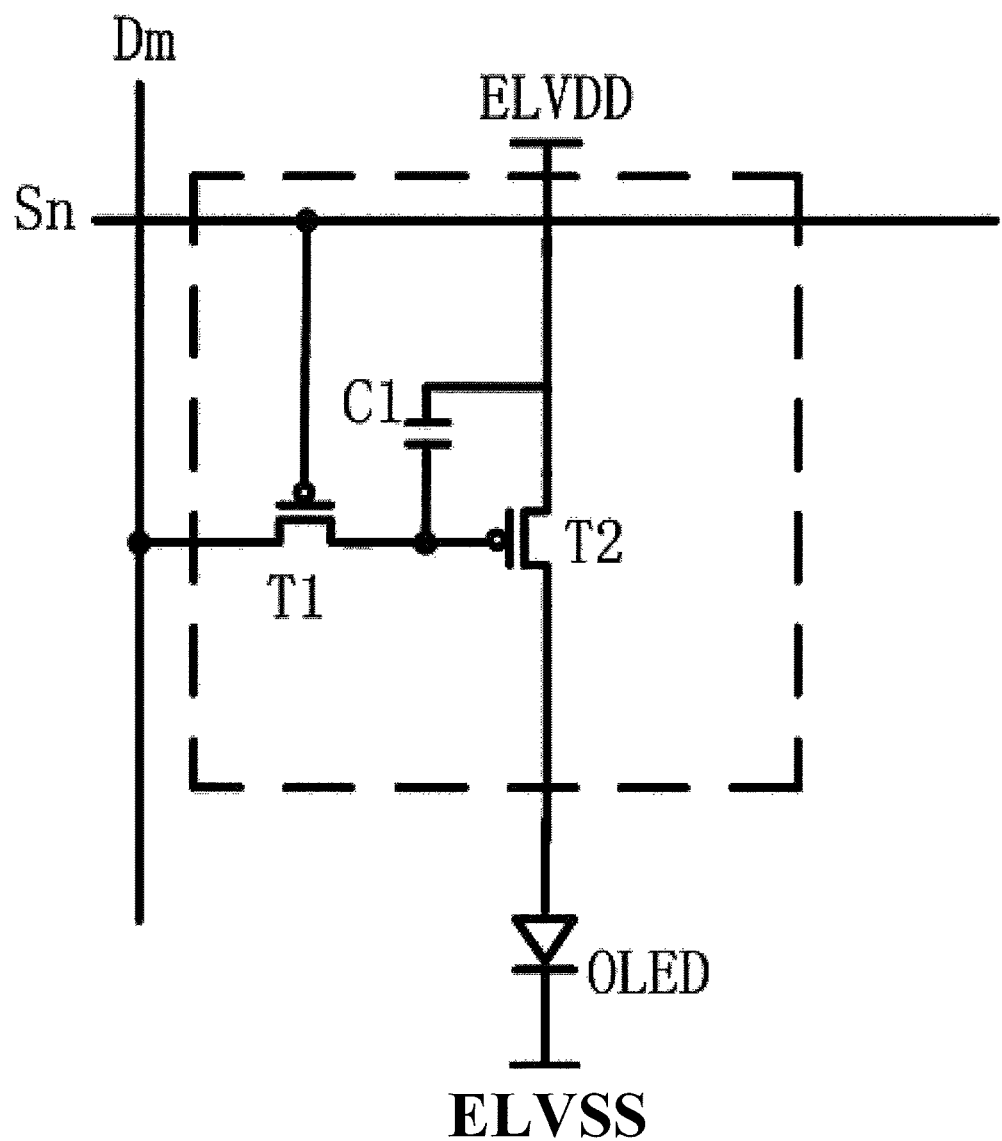
FIG. 1 is a circuit diagram of a pixel unit of an AMOLED panel.
Figure 2:
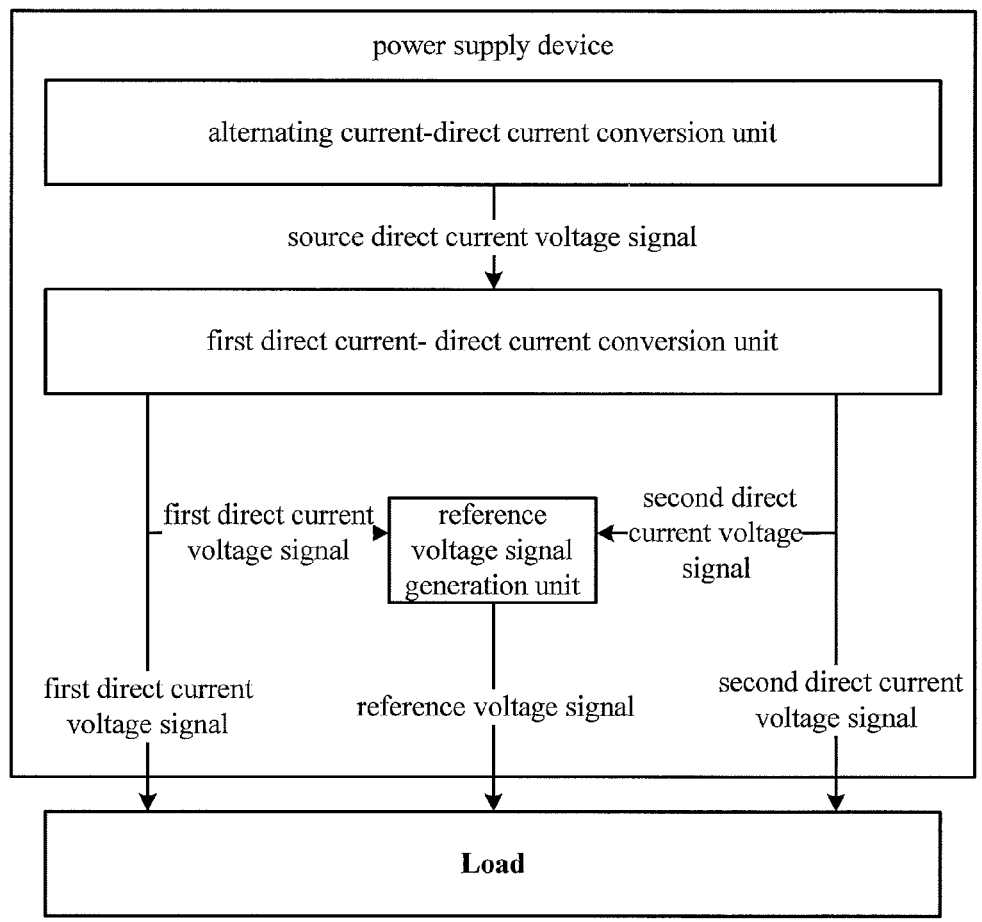
FIG. 2 is a schematic diagram showing a structure of a power supply device according to one embodiment of the present disclosure.

A power supply device of one embodiment of the present disclosure is used to output a first direct current voltage signal of a first voltage and a second direct current voltage signal of a second voltage. As shown in FIG. 2, the power supply device specifically includes:

an alternating current-direct current (AC-DC) conversion unit configured to provide a source direct current voltage signal;

a first direct current-direct current conversion unit configured to generate the first direct current voltage signal and the second direct current voltage signal according to the source direct current voltage signal, output the first direct current voltage signal to the load through a first output interface, and output the second direct current voltage signal to the load through a second output interface;

a reference voltage signal generation unit configured to generate a reference voltage signal by taking the first direct current voltage signal and the second direct current voltage signal as input signals, output the reference voltage signal to the load. A voltage value of the reference voltage signal is smaller than a voltage value of the first direct current voltage signal, and is greater than a voltage value of the second direct current voltage signal.

In one embodiment of the present disclosure, for a load requiring for at least one positive voltage and at least one negative voltage, two power supply signals of different voltage values are firstly generated, then a reference voltage signal of a voltage value between the voltage values of the two power supply signals is generated by using the two power supply signals, and the reference voltage signal is provided to the load so that the load can determine a positive voltage signal and a negative voltage signal based on the reference voltage signal. Comparing with using two DC-DC conversion units to separately generate a positive voltage and a negative voltage in the related art, one embodiment of the present disclosure reduces the number of DC-DC conversion units, thus, the efficiency of power supply can be improved and the total power consumption of the device can be reduced, and the production cost is also reduced.

The power supply device of one embodiment of the present disclosure can be applied in various occasions. In one occasion, the load is an active matrix organic light emitting diode (AMOLED) display panel.

Taking a television as an example, a liquid television takes TFT-LCD as a display panel, uses a backlight module as a light source for the TFT-LCD, which is also a display light source of the liquid television. While in an AMOLED television, since an AMOLED panel is a self-luminous panel, thus the AMOLED panel does not require a backlight module. Since the AMOLED panel includes the electroluminescent component which requires larger current to produce a matrix-type controlled light source so as to form a patterned display, thus, the AMOLED television requires an electroluminescent power supply, e.g., EL power supply.

Since at least three voltage signals are required to drive the AMOLED panel to display, thus, in the related art, three separate DC-DC conversion units are used to provide the above three voltage signals.

When adopting the method of one embodiment of the present disclosure, two voltage signals ELVDD and ELVSS can be generated by one DC-DC conversion unit, thus, one DC-DC conversion unit is reduced compared with the related art, and the production cost can be reduced and the total power consumption of the device can be reduced.

Based on the above description, the power supply device of one embodiment of the present disclosure further includes a second direct current-direct current conversion unit. The reference voltage signal generation unit is configured to output the reference voltage signal to the second direct current-direct current conversion unit. The second direct current-direct current conversion unit is specifically configured to generate a third direct current voltage signal according to the source direct current voltage signal and the reference voltage signal, and output the third direct current voltage signal to the load so as to be used by a logic circuit of the load.

As mentioned above, although one DC-DC unit can generate two direct current voltage signals, if the reference voltage is not between voltages of the two direct current voltage signals, then the two direct current voltage signals cannot be used as positive and negative voltage signals. Thus, the power supply device of one embodiment of the present disclosure includes the reference voltage signal generation unit, which can generate an electric signal of a voltage value between the voltages of the two direct current voltage signals, that is, the voltage value of the reference voltage signal is smaller than the voltage value of the first direct current voltage signal, and is greater than the voltage value of the second direct current voltage signal.

The above reference voltage generation unit of one embodiment of the present disclosure can be realized in a plurality of ways, one of which is described as follows, but embodiments of the present disclosure do not limit to following implementation.

In one embodiment of the present disclosure, the reference voltage generation unit specifically includes:

a voltage divider connected between the first output interface and the second output interface; the voltage divider having a voltage dividing node, and a voltage of the voltage dividing node is between the voltage of the first direct current voltage signal and the voltage of the second direct current voltage signal;

a voltage follower connected with the voltage dividing node of the voltage divider, and configured to generate the reference voltage signal, a voltage value of the reference voltage signal follows the voltage value of the voltage dividing node.

The above structure uses the voltage dividing function of the voltage divider to generate a signal of a voltage value between the voltage value of the first direct current voltage signal and the voltage value of the second direct current voltage signal, and then uses the voltage follower to generate the reference voltage signal having a voltage value following the voltage value of the voltage dividing node, and it can be realized easily.

As mentioned above, the reference voltage signal output from the voltage follower is output to the load and the second direct current-direct current conversion unit; and the transmission of the reference voltage signal between the voltage follower and the load as well as the second direct current-direct current conversion unit is maintained by current. Thus, the voltage follower requires a certain driving capability.

In order to provide such driving capability, a separate voltage source may be provided for the voltage follower. But in order to simplify the circuit, in one specific embodiment of the present disclosure, the two voltage signals output from the first direct current-direct current conversion unit are directly used to drive the voltage follower.

Figure 3:
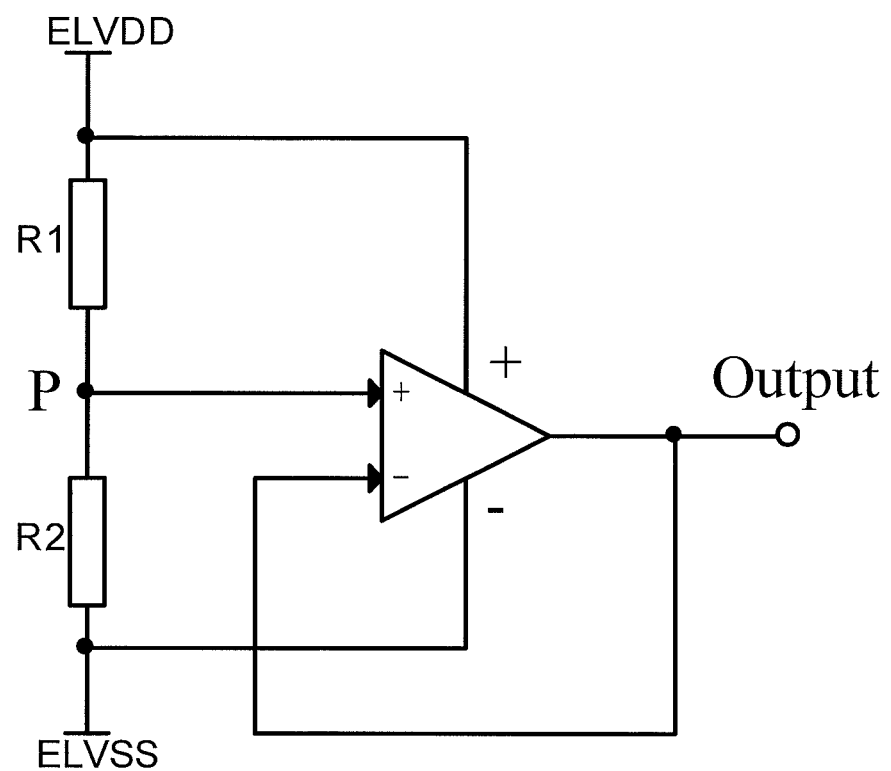
FIG. 3 is a circuit diagram of a reference electric signal generation unit according to one embodiment of the present disclosure.

The voltage follower realized in the above manner can be an operational amplifier. As shown in FIG. 3, a positive input terminal of the operational amplifier is electrically connected with the voltage dividing node P; an inverting input terminal of the operational amplifier is electrically connected with an output terminal Output of the operational amplifier; a positive power supply terminal of the operational amplifier is electrically connected with the first output interface; an inverting power supply terminal of the operational amplifier is electrically connected with the second output interface.

Based on the above structure, since positive and negative power supply terminals of the operational amplifier are connected with two voltage signals output from the first direct current-direct current conversion unit, and the two signals are transmitted to the AMOLED panel to drive OLED, thus a good stability and driving ability can get. That is, current output from the operational amplifier is supplied by the first direct current-direct current conversion unit, thus, the operational amplifier has a certain driving capability, and can transmits the reference voltage signal to the load and the second direct current-direct current conversion unit.

As shown in FIG. 3, the voltage divider of one embodiment of the present disclosure may include a first resistor R1 and a second resistor R2 connected in series; the voltage dividing node P is between the first resistor R1 and the second resistor R2.

Since different products correspond to different positive and negative voltage signals, even products from the same batch, positive and negative voltage signals required by each product are also different due to nuance of the production process. The voltage divider formed by resistors connected in series can easily adjust voltage values of reference voltage signals as illustrated below.

Under conditions that voltage values of ELVDD and ELVSS shown in FIG. 3 are determined, the voltage of the node P is (voltage value of ELVDD−voltage value of ELVSS) R1/(R1+R2), thus, when any one of R1 and R2 is changed, the voltage value of the reference voltage signal is also changed. Once the voltage value of the reference voltage signal is changed, a voltage difference between the ELVDD signal/ELVSS signal and the reference voltage signal is changed, that is, the positive and negative voltages are changed.

The above resistors can be determined before designing the power supply. At least one of the first resistor and the second resistor may be an adjustable resistor; in this case, the power supply device further includes a control unit configured to control resistance of the adjustable resistor, so as to control the voltage value of the reference voltage signal output from the voltage follower.

This way is more convenient to use, even when the product is changed during using process which results in that the required positive and negative voltages are changed, the voltage value of the reference voltage signal can be easily adjusted, thereby improving the product's adaptability and service life.

One embodiment of the present disclosure further provides an electronic device, including a load and any of the above power supply devices.

The load can be an active matrix organic light emitting diode display panel.

When the load is the active matrix organic light emitting diode display panel, the first direct current voltage signal generated by the power supply device is an ELVDD signal which drives electroluminescence of the active matrix organic light emitting diode display panel; the second direct current voltage signal generated by the power supply device is an ELVSS signal which drives electroluminescence of the active matrix organic light emitting diode display panel; the reference voltage signal generated by the power supply device is a GND signal.

It should be noted here, the GND signal is a reference signal, and is not necessary a signal connected to the earth.

The third direct current voltage signal generated by the power supply device is a VCC signal which drives a logic circuit of the active matrix organic light emitting diode display panel.

The above electronic device is illustrated as follows from another aspect.

The electronic device of one embodiment of the present disclosure includes a load and a power supply device outputting a first direct current voltage signal of a first voltage and a second direct current voltage signal of a second voltage to the load. The power supply device specifically includes:

an alternating current-direct current conversion unit configured to provide a source direct current voltage signal;

a first direct current-direct current conversion unit configured to generate the first direct current voltage signal and the second direct current voltage signal according to the source direct current voltage signal, output the first direct current voltage signal to the load through a first output interface and output the second direct current voltage signal to the load through a second output interface;

a reference voltage signal generation unit configured to generate a reference voltage signal by taking the first direct current voltage signal and the second direct current voltage signal as input signals, output the reference voltage signal to the load. A voltage value of the reference voltage signal is smaller than a voltage value of the first direct current voltage signal, and is greater than a voltage value of the second direct current voltage signal.

In one example, the load can be an active matrix organic light emitting diode display panel.

In one example, the power supply device further includes a second direct current-direct current conversion unit. The reference voltage signal generation unit is further configured to output the reference voltage signal to the second direct current-direct current conversion unit. The second direct current-direct current conversion unit is specifically configured to generate a third direct current voltage signal according to the source direct current voltage signal and the reference voltage signal, and output the third direct current voltage signal to the load so as to be used by a logic circuit of the load.

In one example, the reference voltage generation unit specifically includes:

a voltage divider connected between the first output interface and the second output interface; the voltage divider having a voltage dividing node, and a voltage value of the voltage dividing node being between the voltage value of the first direct current voltage signal and the voltage value of the second direct current voltage signal;

a voltage follower connected with the voltage dividing node, and configured to generate the reference voltage signal having a voltage value following the voltage value of the voltage dividing node.

In one example, the voltage follower is an operational amplifier. A positive input terminal of the operational amplifier is electrically connected with the voltage dividing node; an inverting input terminal of the operational amplifier is electrically connected with an output terminal of the operational amplifier; a positive power supply terminal of the operational amplifier is electrically connected with the first output interface; an inverting power supply terminal of the operational amplifier is electrically connected with the second output interface.

In one example, the voltage divider includes a first resistor and a second resistor connected in series. The voltage dividing node is between the first resistor and the second resistor.

In one example, at least one of the first resistor and the second resistor is an adjustable resistor.

In one example, the power supply device further includes a control unit configured to control resistance of the adjustable resistor, so as to control the voltage value of the reference voltage signal output from the voltage follower.

Figure 4:
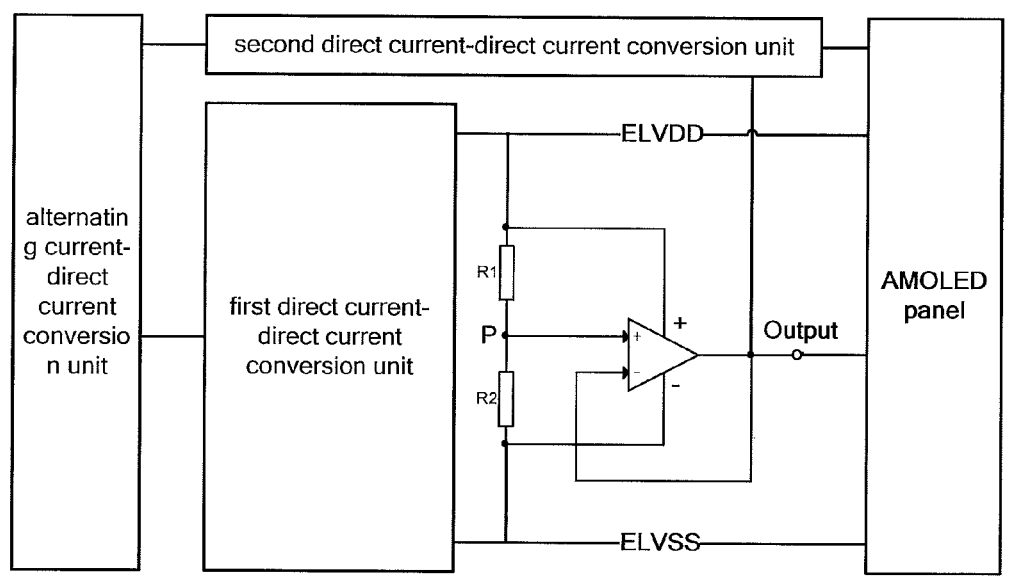
FIG. 4 is a schematic diagram showing a structure of an electronic device which adopts the reference electric signal generation unit shown in FIG. 3 according to one embodiment of the present disclosure.

FIG. 4 is a schematic diagram showing a structure of an electronic device according to one embodiment of the present disclosure. Resistors R1 and R2 are used to divide a voltage to generate an electric potential between ELVDD and ELVSS output from the first direct current-direct current conversion unit; then, a voltage follower is connected, and the voltage follower can be realized by adopting an operational amplifier, thereby forming an electric potential generation circuit. Since positive and negative power supplies of the operational amplifier in the electric potential generation circuit are electrically connected with ELVDD and ELVSS, respectively, thus, current output from the circuit is supplied by the voltage signals ELVDD and ELVSS, and the circuit has a certain driving capability. An output terminal of the circuit is connected with a GND of a logic circuit and a GND of the second direct current-direct current conversion unit which outputs VCC, forming a common reference potential.

Those described above are only merely illustrative, and not restrictive. It should be noted that, for those skilled in the art, improvements and substitutions may also be made without departing from the principle of the present disclosure. Those improvements and substitutions should also be considered as the scope of the present disclosure.

What is claimed is:

1. A power supply device for outputting a first direct current voltage signal of a first voltage and a second direct current voltage signal of a second voltage to a load, the power supply device comprising:
   an alternating current-direct current conversion unit configured to provide a source direct current voltage signal;
   a first direct current-direct current conversion unit configured to generate the first direct current voltage signal and the second direct current voltage signal according to the source direct current voltage signal, output the first direct current voltage signal to the load through a first output interface and output the second direct current voltage signal to the load through a second output interface;
   a reference voltage signal generation unit configured to generate a reference voltage signal by taking the first direct current voltage signal and the second direct current voltage signal as input signals, output the reference voltage signal to the load;
   wherein a voltage value of the reference voltage signal is smaller than a voltage value of the first direct current voltage signal and is greater than a voltage value of the second direct current voltage signal.

2. The power supply device according to claim 1, further comprising a second direct current-direct current conversion unit; wherein the reference voltage signal generation unit is further configured to output the reference voltage signal to the second direct current-direct current conversion unit; the second direct current-direct current conversion unit is configured to generate a third direct current voltage signal according to the source direct current voltage signal and the reference voltage signal, and output the third direct current voltage signal to the load so as to be used by a logic circuit of the load.

3. The power supply device according to claim 2, wherein the reference voltage generation unit comprises:
  a voltage divider connected between the first output interface and the second output interface; wherein the voltage divider has a voltage dividing node, and a voltage value of the voltage dividing node is between the voltage value of the first direct current voltage signal and the voltage value of the second direct current voltage signal;
  a voltage follower connected with the voltage dividing node, and configured to generate the reference voltage signal, a voltage value of the reference voltage signal following the voltage value of the voltage dividing node.

4. The power supply device according to claim 3, wherein the voltage follower is an operational amplifier; a positive input terminal of the operational amplifier is electrically connected with the voltage dividing node; an inverting input terminal of the operational amplifier is electrically connected with an output terminal of the operational amplifier; a positive power supply terminal of the operational amplifier is electrically connected with the first output interface; an inverting power supply terminal of the operational amplifier is electrically connected with the second output interface.

5. The power supply device according to claim 3, wherein the voltage divider comprises a first resistor and a second resistor connected in series; the voltage dividing node is arranged between the first resistor and the second resistor.

6. The power supply device according to claim 5, wherein at least one of the first resistor and the second resistor is an adjustable resistor.

7. The power supply device according to claim 6, wherein the power supply device further comprises:
  a control unit configured to control resistance of the adjustable resistor, so as to control the voltage value of the reference voltage signal output from the voltage follower.

8. An electronic device comprising a load and a power supply device comprising:
  an alternating current-direct current conversion unit configured to provide a source direct current voltage signal;
  a first direct current-direct current conversion unit configured to generate the first direct current voltage signal and the second direct current voltage signal according to the source direct current voltage signal, output the first direct current voltage signal to the load through a first output interface and output the second direct current voltage signal to the load through a second output interface;
  a reference voltage signal generation unit configured to generate a reference voltage signal by taking the first direct current voltage signal and the second direct current voltage signal as input signals, output the reference voltage signal to the load;
  wherein a voltage value of the reference voltage signal is smaller than a voltage value of the first direct current voltage signal and is greater than a voltage value of the second direct current voltage signal.

9. The electronic device according to claim 8, wherein the load is an active matrix organic light emitting diode display panel.

10. The electronic device according to claim 9, wherein the first direct current voltage signal generated by the power supply device is an ELVDD signal which drives electroluminescence of the active matrix organic light emitting diode display panel; the second direct current voltage signal generated by the power supply device is an ELVSS signal which drives electroluminescence of the active matrix organic light emitting diode display panel; the reference voltage signal generated by the power supply device is a GND signal.

11. The electronic device according to claim 10, wherein the third direct current voltage signal generated by the power supply device is a VCC signal which drives a logic circuit of the active matrix organic light emitting diode display panel.

12. The electronic device according to claim 8, further comprising a second direct current-direct current conversion unit; wherein the reference voltage signal generation unit is further configured to output the reference voltage signal to the second direct current-direct current conversion unit; the second direct current-direct current conversion unit is configured to generate a third direct current voltage signal according to the source direct current voltage signal and the reference voltage signal, and output the third direct current voltage signal to the load so as to be used by a logic circuit of the load.

13. The electronic device according to claim 12, wherein the reference voltage generation unit comprises:
  a voltage divider connected between the first output interface and the second output interface; wherein the voltage divider has a voltage dividing node, and a voltage value of the voltage dividing node is between the voltage value of the first direct current voltage signal and the voltage value of the second direct current voltage signal;
  a voltage follower connected with the voltage dividing node, and configured to generate the reference voltage signal, a voltage value of the reference voltage signal following the voltage value of the voltage dividing node.

14. The electronic device according to claim 13, wherein the voltage follower is an operational amplifier; a positive input terminal of the operational amplifier is electrically connected with the voltage dividing node; an inverting input terminal of the operational amplifier is electrically connected with an output terminal of the operational amplifier; a positive power supply terminal of the operational amplifier is electrically connected with the first output interface; an inverting power supply terminal of the operational amplifier is electrically connected with the second output interface.

15. The electronic device according to claim 13, wherein the voltage divider comprises a first resistor and a second resistor connected in series; the voltage dividing node is arranged between the first resistor and the second resistor.

16. The electronic device according to claim 15, wherein at least one of the first resistor and the second resistor is an adjustable resistor.

17. The electronic device according to claim 16, wherein the power supply device further comprises:
  a control unit configured to control resistance of the adjustable resistor, so as to control the voltage value of the reference voltage signal output from the voltage follower.

* * * * *